Sept. 6, 1932.　　　C. J. ANDERSON　　　1,875,547
GRINDING MACHINE
Filed Nov. 20, 1929　　3 Sheets-Sheet 1

Inventor:
Carl J. Anderson,
By Crindall Parker Carlson
Attys.

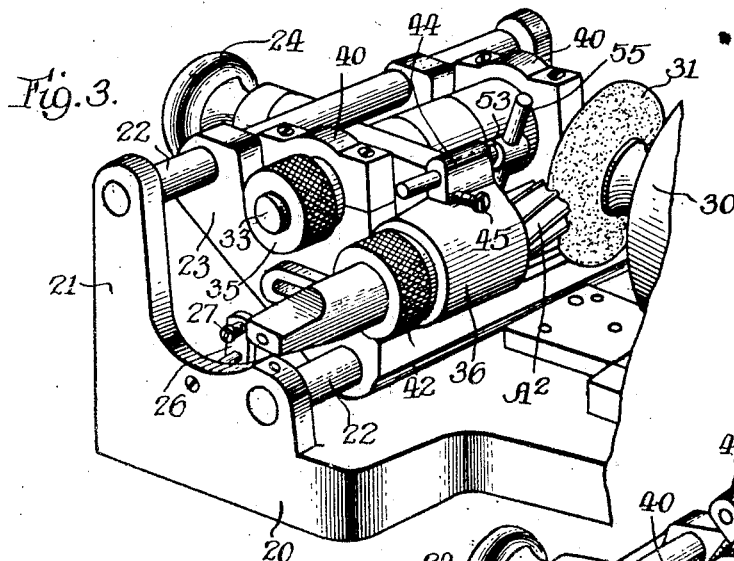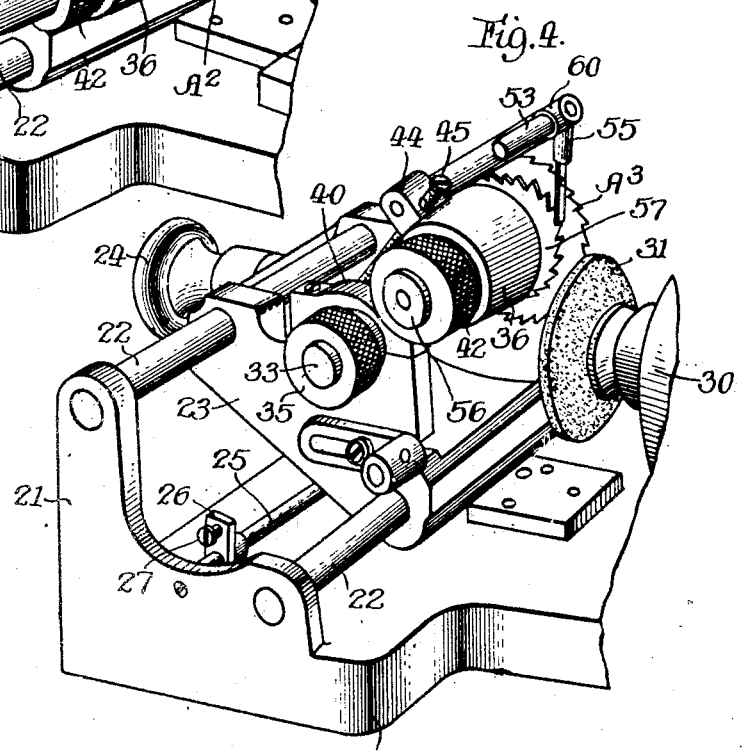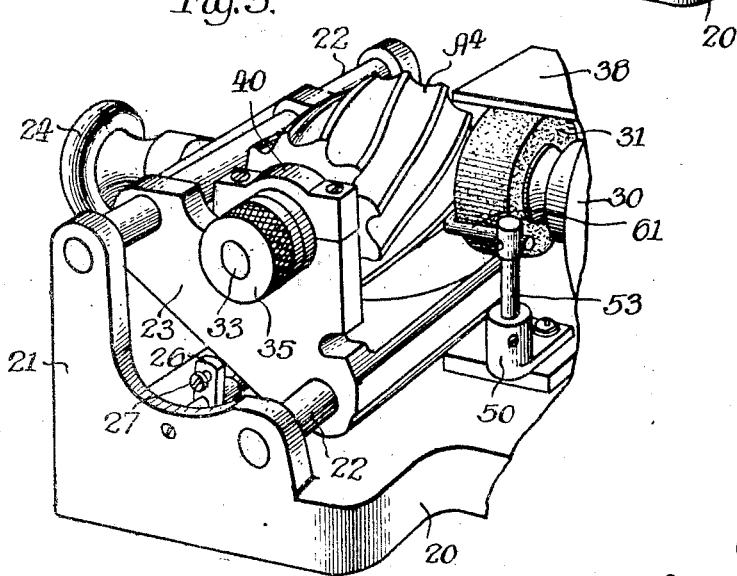

Sept. 6, 1932.   C. J. ANDERSON   1,875,547
GRINDING MACHINE
Filed Nov. 20, 1929   3 Sheets-Sheet 3
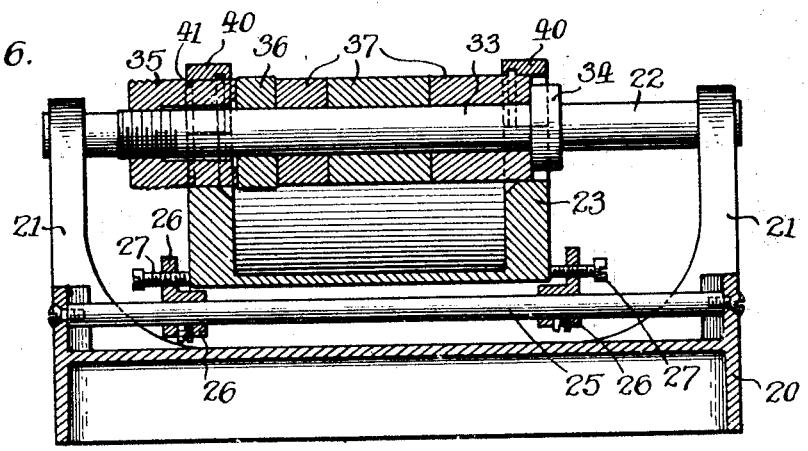
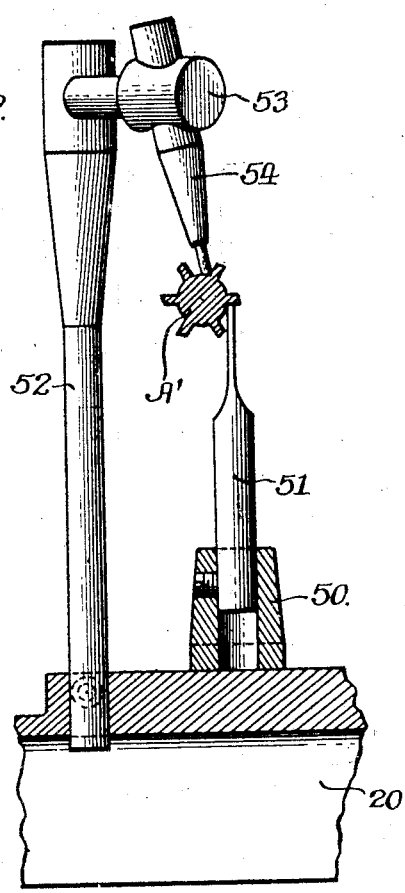
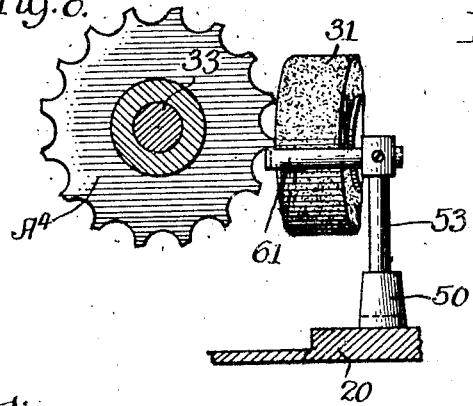
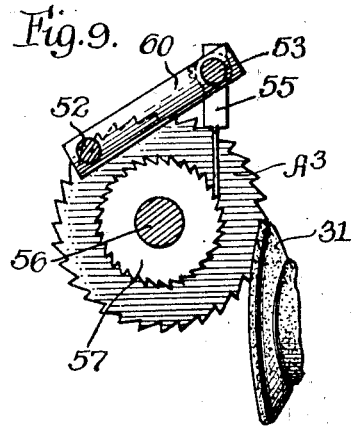
Inventor:
Carl J. Anderson,
By Churchill Parker Carlson
Attys.

Patented Sept. 6, 1932

1,875,547

UNITED STATES PATENT OFFICE

CARL J. ANDERSON, OF CHICAGO, ILLINOIS, ASSIGNOR OF FIFTY-ONE AND TWO-THIRDS PER CENT TO ERIK BORG AND FIFTEEN PER CENT TO CARL U. JOHANSON, BOTH OF CHICAGO, ILLINOIS

GRINDING MACHINE

Application filed November 20, 1929. Serial No. 408,435.

This invention relates generally to grinding machines and more particularly to a bench type grinding machine for grinding tools or the like.

The general object of this invention is to provide a novel tool grinder having adjustments and equipped with various attachments so that different types of tools such as milling cutters of different forms may be simply and accurately ground.

Another object is to provide such a grinder which may be mounted upon a bench to be operated by a comparatively unskilled workman, and which requires but few steps to be changed from grinding one form of cutter to another.

Other objects and advantages will become apparent from the following description description taken in connection with the accompanying drawings, in which:

Fig. 3 is a perspective view of a portion of the machine arranged for grinding the teeth on the end of a milling cutter.

Fig. 4 is a perspective view of a portion of the machine arranged for grinding the teeth of a circular saw.

Fig. 5 is a perspective view of a portion of the machine arranged for grinding the side of a large spiral cutter.

Fig. 6 is a vertical section taken along the line 6—6 of Fig. 2, and showing a portion of the carriage and cutter-carrying device.

Fig. 7 is a fragmentary sectional view taken along the line 7—7 of Fig. 1 and showing the guide means employed in the machine as arranged in Figs. 1 and 2 for grinding the side of a small spiral cutter.

Fig. 8 is a view similar to that shown in Fig. 7 but of the guide means employed in the machine shown in Fig. 5 when arranged for grinding the side of a large spiral cutter.

Fig. 9 is a view similar to that shown in Fig. 7 but of the guide means employed in the machine shown in Fig. 4 when arranged for grinding the teeth of a circular saw.

Figure 1:
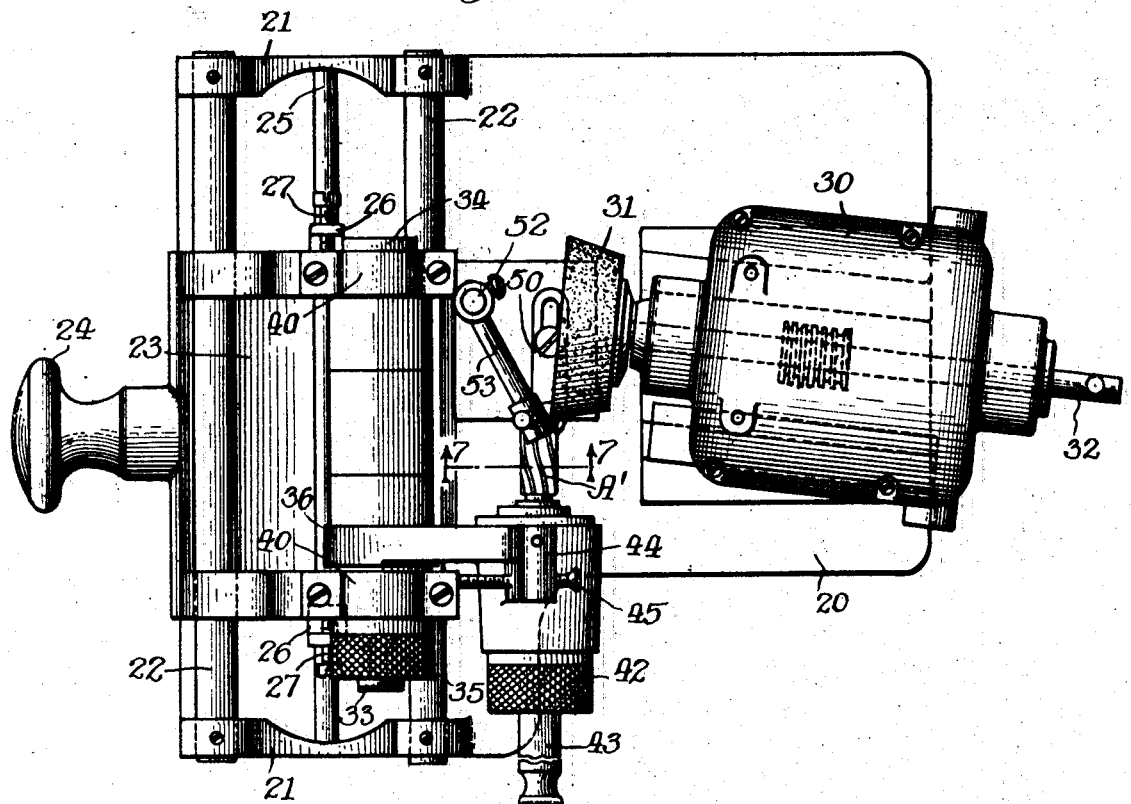
Figure 1 is a plan view of a machine for grinding milling cutters or the like arranged for grinding the side of a small spiral cutter and embodying the features of my invention.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

The present embodiment of the invention comprises generally a frame, a carriage suitably mounted on the frame, a cutter-carrying device mounted on the carriage, means for grinding the cutter, and guide means adapted to hold the cutter in an indexed position relative to the grinding means. As illustrated herein, the machine is equipped with various auxiliary devices and various adjustments are provided so that different forms and sizes of cutters may be ground thereon.

In the present instance, the frame comprises a base 20 of cast metal upon which are formed integrally two uprights 21 at the front and back thereof respectively. Mounted horizontally in the uprights 21 are a pair of spaced parallel guide bars 22, upon which a carriage 23 is slidably mounted.

The carriage 23 comprises a casting having spaced end portions through which pass the bars 22. A handle 24 is mounted thereon by which the carriage may be slid back and forth. Below the carriage and mounted in the uprights 21 is a rod 25 upon which stops 26 are slidably mounted either for limiting the extent of the sliding movement of the carriage 23 or for locking it rigidly in an adjusted position. The stops 26 are provided with screws 27 against which the carriage abuts to provide accurate adjustment of the latter.

In the present embodiment, the means for grinding the cutter comprises a motor 30 adjustably mounted on the base 20 and carrying a grinding wheel 31 upon its spindle. The adjustment of the motor is accomplished by means of a dovetail formed in the base 20 in which the motor is slid by means of a screw rotated by a handle 32. Suitable locking means is provided for locking the motor in its adjusted position. A detachable guard plate 38 may be mounted on the top of the motor to extend out over the wheel 31 to prevent particles from being thrown upward.

Figure 2:
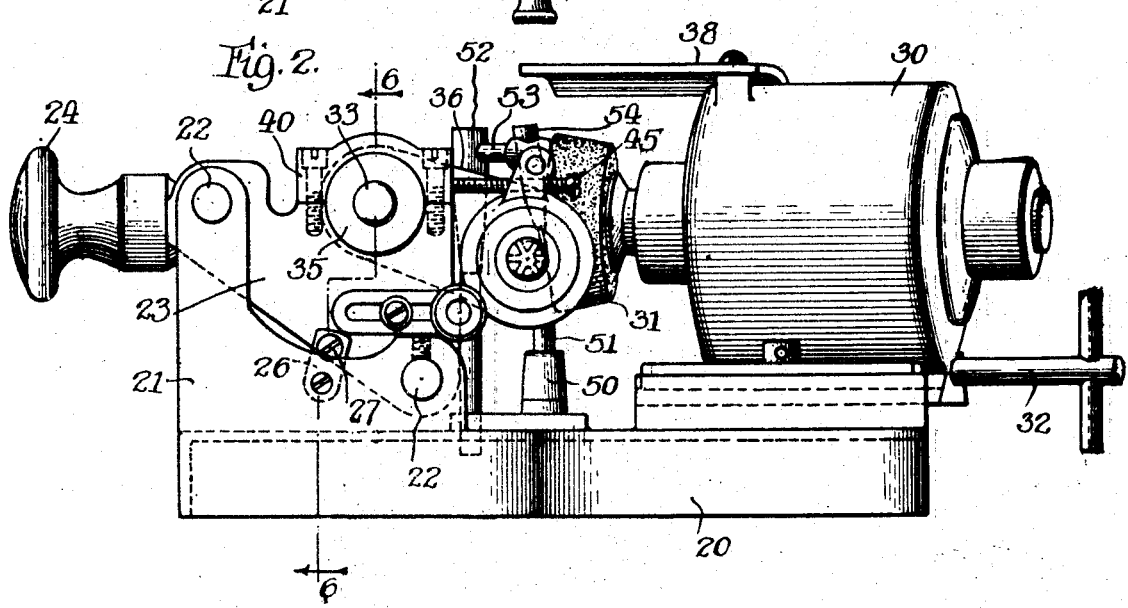
Fig. 2 is a front view of the machine as arranged in Fig. 1.

As mentioned above, the invention includes a cutter-carrying device mounted upon the carriage 23. This device differs in its arrangement when cutters of different forms are to be ground. The machine as shown in Figures 1, 2 and 7 is arranged for grinding the side of a spiral cutter, and the cutter-carrying device in this arrangement comprises an arbor 33 having a head 34 formed on one end and on the other end a knurled nut 35 is threaded. An arm 36 is pivoted upon the arbor 33 and may be clamped rigidly thereto by means of the knurled nut 35 and spacing washers 37. The arbor 33 together with the nut 35 and the washers 37 are mounted in split bearings 40 formed in the end portions of the carriage 23. To clamp the arbor 33, and hence the arm 36, the knurled nut 35 is provided with an annular groove. The cap on the bearing 40 adjacent the knurled nut 35 is provided with a lip 41 fitting into the annular groove of the nut 35 so that when the cap on the bearing 40 is tightened, the arbor 33 as well as the arm 36 is prevented from turning or from moving endwise. Thus, the arm 36 may be adjusted and clamped in its adjusted position.

On the free end of the arm 36, a bearing is formed in which is journaled a hollow spindle 42, the hole therethrough having a standard Morse taper, and within the latter there is mounted a secondary spindle 43 having a sleeve whose outside surface is ground to a Morse taper to fit into the spindle 42, and which permits the spindle 43 to be slid axially therein. The end of the spindle 43 adjacent the wheel 31 is drilled out to receive the shank of the small spiral milling cutter A' coaxially therewith.

For grinding the cutter A', the arm 36 is set so that the center of the cutter is below the center of the wheel 31 and is locked relative to the carriage by the knurled nut 35 and the bearing caps 40. The carriage 23 is moved to a position such that, by sliding the secondary spindle 43 within the hollow spindle 42, the cutter will be moved across the wheel 31, and the carriage there locked in place by the stops 26. To provide further support for the arm 36 relative to the carriage 23, a lug 44 is formed on the upper side of the free end of the arm 36 and in it a screw 45 is threaded. By turning the latter until it abuts against the bearing cap 40 adjacent the arm, or a portion of the same bearing, movement of the arm relative to the carriage is prevented.

To rotate the cutter A' during the sliding movement of the spindle 43 to provide for the spiral shape of the cutting teeth and thereby hold the cutter in an indexed position relative to the grinding means, guide means are provided comprising, in the present arrangement, a bracket 50 mounted upon the base 20 adjacent the cutter and drilled to provide a socket in which a vertical guide finger 51 is supported. The upper end of the guide finger 51 is of reduced thickness to provide a narrow edge adapted to abut against the underside of the tooth being ground adjacent the point of grinding. As the spindle 43 is slid to move the cutter toward the wheel 31, the finger 51 causes the cutter to rotate in accordance with the pitch of the spiral and thereby hold the cutter in an indexed position relative to the wheel 31 so that the teeth are ground with a constant angle of clearance. A cup-shaped wheel is most suited to this form of grinding.

Further support for the cutter during grinding is provided by means comprising a vertical bracket or standard 52 mounted on the base 20 and a horizontal arm 53 attached to the top thereof and adapted to extend over the cutter. Adjustably fixed in the end of the arm 53 is spring finger 54 whose tip is yieldingly held in contact with a tooth on the upper side of the cutter. The spring finger 54 thus gives additional steadiness to the cutter during the grinding and also assists in indexing it.

If the cutter to be ground had straight teeth rather than spiral the same arrangement of fingers would be used, but no rotation of the cutter would be caused on moving it toward the wheel. If left hand cutters are to be ground instead of the right hand form shown, the two fingers are to be placed in abutment with teeth on the side of the cutter opposite that on which the grinding wheel is located.

The machine is illustrated in Fig. 3 is arranged for grinding the teeth on the end of a spiral milling cutter $A^2$. The cutter here shown is of such a size that its shank which has a Morse taper is adapted to fit directly within the hollow spindle 42. In this arrangement the arm 36 is locked in such a position that the axis of the cutter lies in the same horizontal plane with the axis of the wheel 31 which in this case is of the saucer type. The rear carriage stop 26 is set so that the carriage 23 may be slid rearwardly only so far as to permit the cutter to be moved axially toward the wheel a distance sufficient for the latter to grind to the required depth.

For indexing the cutter in this arrangement, the lug 44 is provided with a hole parallel to the cutter in which is fixed the arm 53 used in the arrangement previously described. Mounted in the outer end of the arm 53 is an indexing finger 55 whose end comprising a flat spring is adapted to abut against one of the side teeth on the side of the cutter opposite to the wheel, in the case of a right hand cutter. Thus, as viewed in Fig. 3, the cutter is prevented from rotating in a clockwise direction while it may be indexed counterclockwise because the clearance of the adjacent tooth in being turned against the flat spring of the finger 55 will cause it to flex sufficiently to permit the tooth to pass. For left hand cutters, it is evident that the flat spring of the finger 55 will be set to abut against a tooth on the same side of the cutter as the wheel.

In Figs. 4 and 9, the machine is shown arranged to grind the teeth of a circular saw $A^3$ or for cutting new teeth in a blank saw plate. For this type of grinding, an arbor 56 having a Morse taper is mounted in the hollow spindle 42 and on its end, the saw $A^3$ and a notched plate 57 such as another saw having the same number of teeth as the saw $A^3$, whose purpose will be later described, are mounted spaced from the bearing in the arm 36 and from each other by means of washers, with the saw 57 between the bearing and the saw $A^3$. In this operation a saucer shaped wheel is used. The arm 36 is locked in such a position that the axis of the saw will lie in a horizontal plane with the top of the wheel. Thus, when the saw is indexed to a position in which the radial cutting edge of one tooth is horizontal, it is in a position which permits the wheel to grind that edge if the carriage 23 is moved so that the saw is directly over the center of the wheel. The rear stop 26 is set so that the carriage 23 may not be moved rearwardly farther than to the position above described, in order that the effect of the curvature of the wheel will be symmetrical as to the teeth of the saw.

For indexing the saw and holding it in its indexed position, the standard 52 used in the arrangement shown in Figs. 1, 2 and 7 is used in this arrangement and is mounted in the lug 44 to project outwardly therefrom toward the saw. On its end, a right angle extension 60 is mounted in which the arm 53 is fixed. In the latter, the indexing finger 55 is fixed with the flat spring end extending downwardly to abut against a tooth of the other saw or notched plate 57 on the side adjacent the wheel. The notched plate or saw 57 is mounted on the arbor 56 in such a manner that its teeth on the side toward the wheel project upwardly so that the flat spring of the indexing finger 55 is rigid against counterclockwise turning movement of the saw 57 as viewed in Fig. 9 but may be flexed to pass a tooth when the saw 57 is turned clockwise. Thus, the saw $A^3$ being ground is prevented from turning away from a grinding position. The indexing is done when the carriage 23 is slid to the front of the machine and the saw $A^3$ is away from the grinding wheel.

If it is desired merely to regrind the teeth of a saw, the notched plate or saw 57 used for indexing need not be used, and instead, the indexing may be controlled by the teeth of the saw $A^3$ itself. For this, the indexing finger 55 is placed in a position substantially parallel to the extension 60 so that the flat spring end of the finger 55 will abut against a tooth on the side of the saw $A^3$ opposite to the side being ground.

Figs. 5 and 8 show the machine arranged for grinding the side of a large spiral cutter $A^4$. For this arrangement, the arm 36 is not used but the cutter is mounted directly upon the arbor 33 in the bearings on the carriage 23 and clamped thereon between the head 34 of the arbor 33 and the knurled nut 35 with whatever spacing washers 37 are necessary. The arbor 33 is permitted to rotate freely in the bearings by loosening the caps 40. A cup-shaped grinding wheel is best adapted for this operation.

The indexing of the cutter $A^4$ is accomplished by means comprising the bracket 50 secured to the base 20 similarly as in the first arrangement described. In the bracket 50, the arm 53 is mounted in a vertical position. A bent guide finger 61 is fixed substantially horizontally to the arm 53 and extends toward the cutter adjacent the point of grinding. The finger 61 comprises a shank having a narrowed end bent at a right-angle thereto to fit in under the tooth being ground. Thus, as the carriage 23 is slid rearwardly to move the cutter across the wheel, the finger 61 causes the cutter to rotate counterclockwise as viewed in Fig. 8 in accordance with the pitch of the spiral teeth and to maintain a uniform angle of grinding. If the teeth on the cutter were straight instead of spiral, no rotation of the cutter would be caused by sliding the carriage.

From the above description it is apparent that the machine may be arranged to grind other forms of cutters than those illustrated herein by re-arranging the mounting of the cutter and the indexing attachments. Thus, I have provided a novel tool grinder adapted to grind milling cutters of different forms in a simple and accurate manner, the grinder being adapted to be mounted upon a bench to be operated by a comparatively unskilled workman and requiring but few steps to rearrange it from grinding one form of cutter to another.

I claim as my invention:

1. A machine for grinding milling cutters or the like comprising, in combination, a frame having a pair of uprights on the sides thereof, a pair of spaced horizontal guide bars mounted on said uprights, a carriage embracing both of said bars and slidable thereon, a horizontal rod mounted in said uprights between said bars, adjustable stops secured on said rod for limiting the sliding movement of said carriage to cause the cuts on all teeth to be equal, a cutter carrying device adjustably mounted on said carriage, means for locking said device in its adjusted position, means for grinding the cutter, and guide means adapted to hold the cutter in an indexed position relative to the grinding means.

2. A machine for grinding milling cutters or the like comprising, in combination, a frame comprising a flat base adapted to rest on a bench and having a pair of uprights on the sides thereof, a pair of parallel round rods extending between said uprights and spaced from each other, a carriage having round bearings slidably mounted on said bars, means for limiting the sliding movement of said carriage, a cutter-carrying device pivotally mounted on said carriage for adjustment transversely to the movement of the carriage, a motor mounted on the flat base for adjustment transversely to the movement of the carriage, a grinding wheel attached to said motor, and guide means adapted to hold the cutter in an indexed position relative to the grinding means.

3. A machine for grinding teeth in a circular saw or the like comprising, in combination, a frame, a carriage slidably mounted in said frame, an arm pivotally mounted on said carriage for movement in a plane perpendicular to the direction of movement of said carriage, means for locking said arm in its adjusted position, means for grinding the cutter, an arbor rotatably mounted on the free end of said arm and adapted to support the cutter, a toothed index plate mounted on said arbor, an index finger mounted on said arm and adapted to abut a tooth of said index plate to hold the cutter in an indexed position relative to the grinding means, and means for limiting the movement of the carriage to a point where the tooth being ground lies directly over the center of the grinding means to provide a substantially symmetrical face on the tooth.

4. A machine for grinding milling cutters or the like comprising, in combination, a flat base adapted to rest on a bench and having a pair of uprights cast integrally with the base on opposite sides thereof, a pair of round rods extending between said uprights, said rods being parallel to and spaced from each other, a carriage comprising a pair of spaced members having pairs of alined holes slidably receiving said rods, an arm pivotally supported on said carriage on an axis parallel to said rods, means for clamping said arm to said carriage, means on the free end of said arm for rotatably supporting the cutter on an axis parallel to the rods, a motor mounted on said base, a grinding wheel mounted on the spindle of said motor with its axis substantially at a right angle to said rods, means for adjusting said motor on the base axially of the grinding wheel, and guide means against which a cutter tooth is held to maintain the cutter in grinding relation to the wheel.

5. A machine for grinding various sizes of milling cutters and the like comprising, in combination, a frame, a pair of guide bars supported by said frame, a carriage slidably mounted on said bars, and means for rotatably supporting different sizes of cutters on said carriage comprising an arbor mounted in said carriage and adapted to support relatively large cutters, and means adapted to be detachably associated with said arbor when small cutters are to be ground, said last-mentioned means comprising an arm adapted to be mounted on said arm for pivotal adjustment about the axis of the arbor, and means mounted on the free end of said arm for rotatably supporting a small cutter.

6. A machine for grinding various sizes of milling cutters and the like comprising, in combination, a frame, a pair of guide bars supported by said frame, a carriage slidably mounted on said bars, and means for rotatably supporting different sizes of cutters on said carriage comprising an arbor mounted in said carriage and adapted to support relatively large cutters, and means adapted to be detachably associated with said arbor when small cutters are to be ground, said last-mentioned means comprising an arm adapted to be mounted on said arm for pivotal adjustment about the axis of the arbor, said arm having a hub at its free end, and a spindle slidably and rotatably mounted in said hub and adapted to support a small cutter.

In testimony whereof, I have hereunto affixed my signature.

CARL J. ANDERSON.